(12) United States Patent
Van De Moortele

(10) Patent No.: US 8,048,301 B2
(45) Date of Patent: Nov. 1, 2011

(54) DEVICE FOR TREATING A FLUID

(75) Inventor: Guido Ivo Caesar Maria Van De Moortele, Antwerp (BE)

(73) Assignee: Delta Water Engineering Limited, Limerick (IE)

( * ) Notice: Subject to any disclaimer, the term of this patent is extended or adjusted under 35 U.S.C. 154(b) by 554 days.

(21) Appl. No.: 12/282,890

(22) PCT Filed: Mar. 13, 2007

(86) PCT No.: PCT/BE2007/000025
§ 371 (c)(1),
(2), (4) Date: Sep. 15, 2008

(87) PCT Pub. No.: WO2007/104114
PCT Pub. Date: Sep. 20, 2007

(65) Prior Publication Data
US 2009/0078635 A1    Mar. 26, 2009

(30) Foreign Application Priority Data

Mar. 15, 2006  (BE) .................................. 2006/0160

(51) Int. Cl.
*B01D 24/12* (2006.01)
(52) U.S. Cl. .................. 210/288; 210/289; 210/293

(58) Field of Classification Search .................. 210/269, 210/279, 281, 288, 289, 291, 293, 428
See application file for complete search history.

(56) References Cited

U.S. PATENT DOCUMENTS

| | | | |
|---|---|---|---|
| 2,007,615 A | | 7/1935 | Ross |
| 3,759,062 A | | 9/1973 | Wrenn et al. |
| 4,368,123 A | * | 1/1983 | Stanley .......................... 210/269 |
| 5,045,187 A | * | 9/1991 | Suchanek ........................ 210/91 |
| 2006/0060289 A1 | * | 3/2006 | Carter et al. .................... 156/187 |

FOREIGN PATENT DOCUMENTS

| | | | |
|---|---|---|---|
| DE | 19 64 598 A1 | 7/1970 | |
| DE | 4136852 A1 * | 5/1993 | .................... 210/275 |
| DE | 93 20 039 U1 | 6/1994 | |
| EP | 1 249 674 A | 10/2002 | |

* cited by examiner

*Primary Examiner* — Matthew Savage
(74) *Attorney, Agent, or Firm* — Bacon & Thomas, PLLC

(57) ABSTRACT

The invention relates to a device 1 for treating a fluid, including a container 2,3 with inner space, at least one entrance to the inner space arranged on the container, wherein the entrance includes a first and second opening 4,5, a grid body 14 which is arranged in the inner space and which divides the inner space into a first compartment for a treatment arrangement, preferably filter material, connected to the first opening 4 and at least one second compartment which is connected by means of a tube 25 to the second opening 5 and which is free of filter material. The tube has a connector arrangement for connecting the second opening to the first compartment.

16 Claims, 4 Drawing Sheets

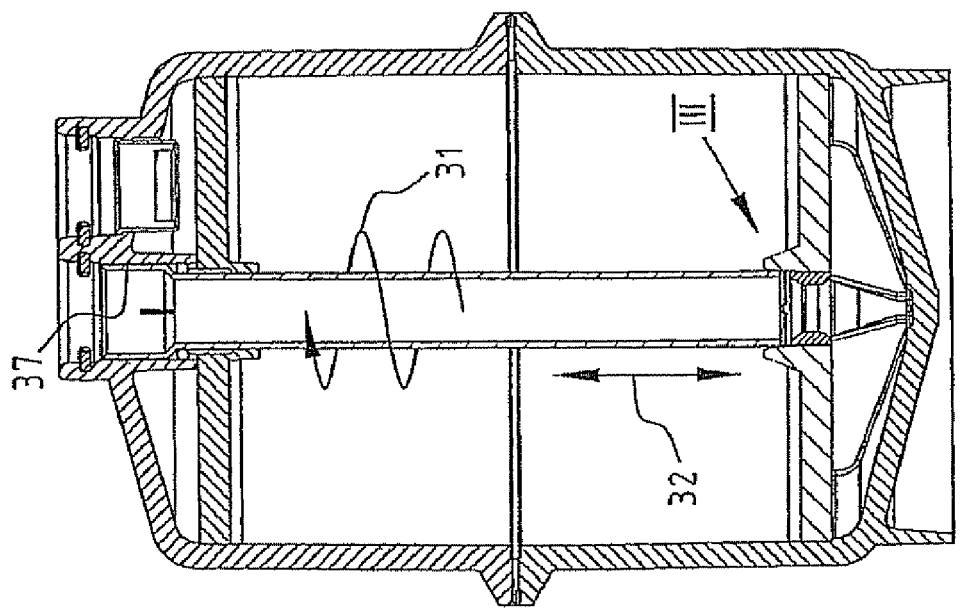
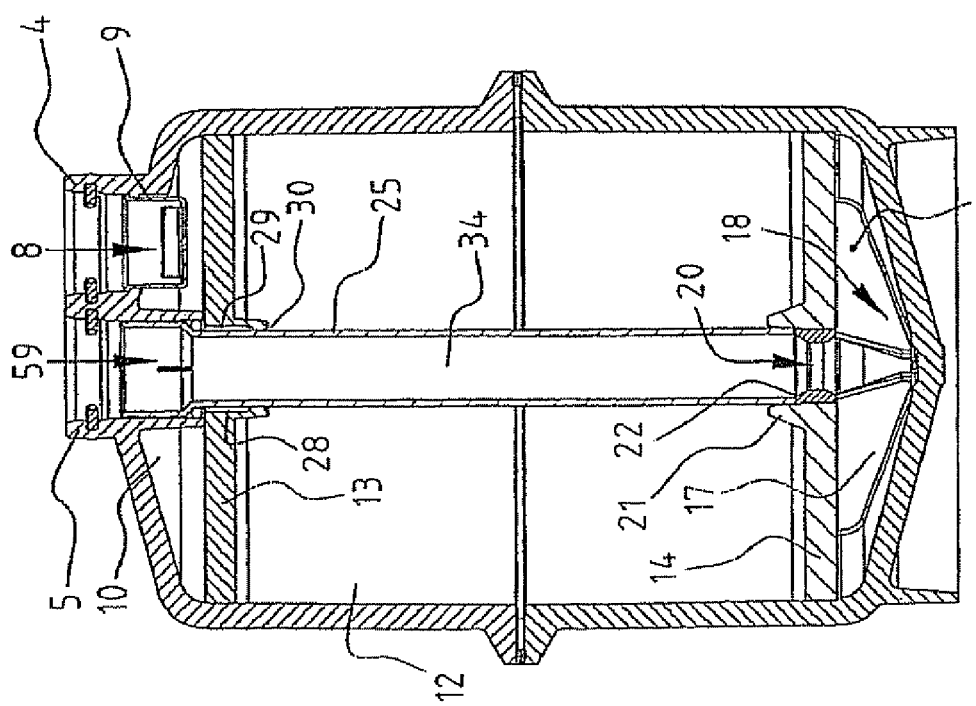

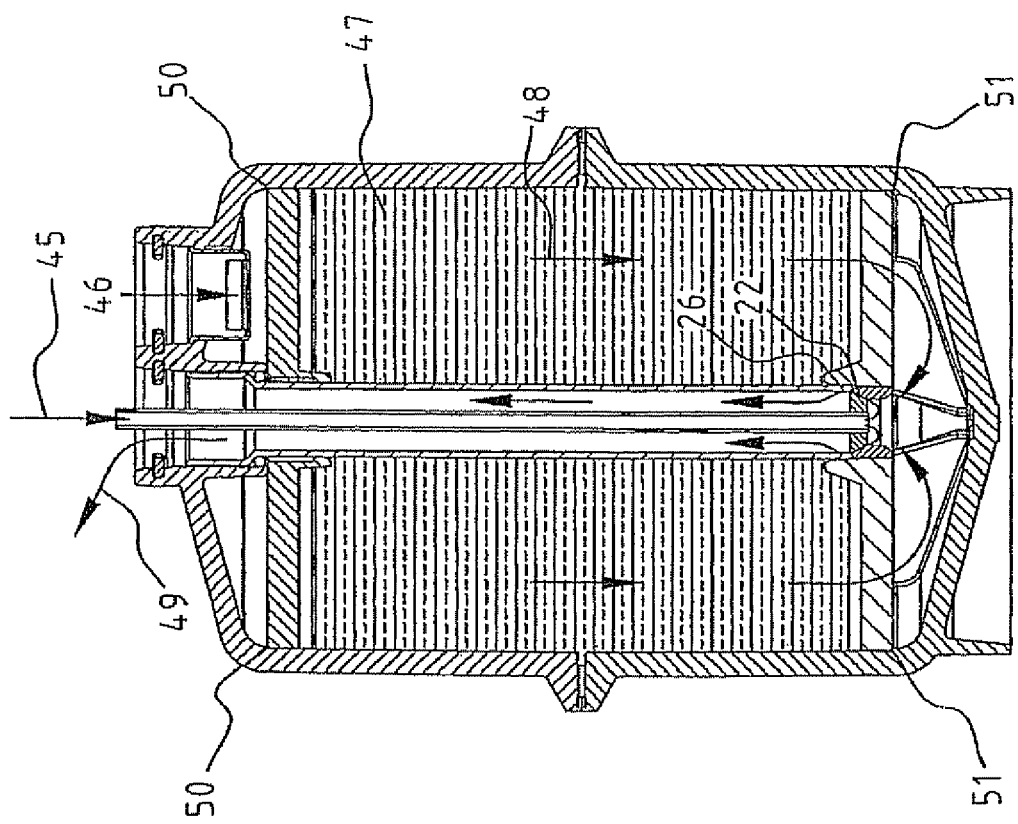
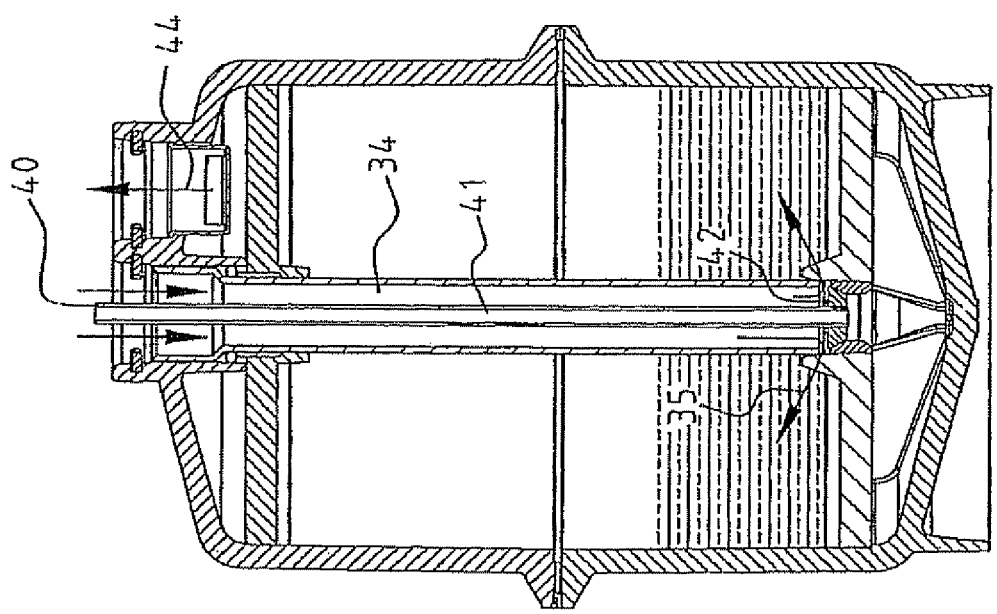

DEVICE FOR TREATING A FLUID

BACKGROUND

The invention relates to a device for treating a fluid, comprising a container with an inner space, at least one entrance to the inner space arranged on the container, wherein the entrance has at least a first opening and a second opening.

SUMMARY OF THE INVENTION

Such a device can be used to treat, in particular filter, a fluid such as water. The device according to the invention is preferably used for households and catering establishments, so-called small-scale consumption. A treatment means is preferably arranged in the inner space. This is preferably a filter material such as a resin, although other materials with a cleaning action can also be applied, such as sand. Part of the contamination of the fluid remains behind in the filter material when the fluid is guided through the material.

The fluid is introduced into the inner space via the entrance to the inner space. Via one of the openings, the inlet, the fluid is guided through the filter material and then guided outside via the other opening, the outlet, via either the same entrance or via a second or other entrance.

Preferably arranged in the inner space is a grid body which divides the inner space into a first compartment for treatment means connected to the first opening and at least one second compartment which is connected to the second opening and which is free of filter material. The second compartment is preferably connected by means of a tube to the second opening, and thus to the entrance to the inner space, the second compartment is preferably located downstream of the first compartment. The fluid is hereby treated or purified in the first compartment, and the purified fluid is collected in the second compartment and carried via the second opening out of the inner space.

Preferably arranged between the first opening and the first compartment is a separating element or containing means which prevents outflow of treatment material via the first opening. The treatment material is hereby contained and held fast in the first compartment.

Such treating devices are known. A problem of the known treatment devices is the arranging of the treatment means in the inner space, and in particular the reuse of the treatment device, for instance by removing and rearranging the treatment means.

The invention has for its object to provide a solution to this and other problems. According to a first aspect, the invention for a treatment device according to the heading of claim 1 is obtained in that the tube has connecting means for connecting the second opening to the first compartment. Packing material can hereby be carried in or out of the first compartment while both openings are used.

The connection is closed in the situation of use, i.e. there is no connection between the second opening and the first compartment. In the filling or emptying situation the connecting means, for instance a controllable valve, connects the tube to the first compartment. A bypass is created from and to the second compartment.

The treatment material is supplied or discharged via the one opening, preferably the second opening. Fluid, preferably water, although optionally compressed air, is supplied and/or discharged to the first compartment via the other opening, preferably the first opening. The fluid can be discharged via the second opening.

In a preferred embodiment the separating element is placed between first opening and first compartment. When the treatment device according to the invention is being emptied the first opening is then the inlet for fluid being used to flush the first compartment. The contaminated treatment material can be discharged via the opened connection to the tube and the second opening. In the filling situation the treatment material is carried into the first compartment via the tube and the opened connecting means. A carrier is often used here. This is preferably an excess of the fluid such as water. The carrier is discharged and collected via the first opening.

The tube is preferably accommodated movably in the inner space. The connection to the first compartment can be effected due to the mobility. By moving the tube to a first position the tube connects the second opening directly to the second compartment, and the connection to the first compartment is closed. In a second position, by displacing the tube in the inner space, the tube connects the second opening to the first compartment. It is possible here for the connection to the second compartment to be still available. The connection of the tube to the second compartment is preferably closed. This is possible for instance by means of a placeable plug means which closes the connection of the tube to the second compartment via the entrance and the second opening. The connecting means axe adapted to accommodate the tube movably in the treatment device.

It is also favourable for the tube to have engaging means which can be engaged through the second opening. The tube can then be engaged from outside the container. The tube can herein be engaged through the second opening via the entrance. The engaging means can for instance be formed by a socket. This can be engaged by a socket wrench. Through the rotation by means of the engaging means the tube can be rotated out of an interlocking, whereby the connecting means connect the tube and the second opening to the first compartment.

According to a preferred embodiment, the connecting means are formed by a screw thread arranged on a tube. The tube can hereby be screwed into a first position. The connection to the second compartment is herein closed. By rotating the tube, the tube will move in a lengthwise direction through the inner space. An opening to the first compartment can herein be opened. The screw thread of the tube preferably co-acts with the screw thread on the treatment device, for instance screw thread on an inner side of the opening or entrance.

The grid body applied according to the invention preferably has a contact surface on which an outer end of the tube lies. In the position of use an outer end of the tube lies on the grid body. Due to the contact the connection of the tube to the first compartment is broken. In the filling or emptying situation the connection between tube interior and first compartment is formed by the gap between tube outer end and contact surface. When the tube is provided with screw thread, the tube is preferably movable in a direction perpendicularly of the contact surface. Due to the rotation the tube end can be moved toward and away from the contact surface. Particularly the pressure force with which the tube/the tube end presses on the contact surface can be adjusted. By further rotation in the tightening direction of the screw connection the pressure force of the tube end on the contact surface will increase. A pressure force will be exerted in the inner space of the container, wherein the screw thread-holding part thrusts against the contact surface.

The contact surface is preferably formed by an inner edge of an upright edge of a recess running through the grid body. When the tube lies on the contact surface an open connection can hereby be formed between tube interior and the recess, and thus the second compartment.

It is a further advantage that a second grid body is arranged in the inner space between the first opening and the first compartment. The first compartment is hereby further bounded and the filter material arranged in the first compartment is better contained. In addition, the second grid body has a distributing function for the fluid. When contaminated fluid is admitted via the first opening into the inner space, it enters a third compartment which is closed by the second grid body of the first compartment.

According to a preferred embodiment, the second grid body has a recess provided with a screw thread which co-acts with the connecting means of the tube. The tube can hereby run through the second grid body, subsequently through the first compartment and then be connected to the second compartment. In addition, when two grid bodies are applied and the tube is screwed into the position of use, the above described pressure effect will hereby occur, whereby the two grid bodies are positioned fixedly in the inner space.

It is a further advantage that the first opening is the inlet for the fluid. Untreated fluid preferably enters the third compartment via the inlet. A fluid distributing means is preferably arranged between the first opening and the first compartment, most preferably in the third compartment. The fluid is hereby distributed before the fluid enters the first compartment downstream of the first opening. The flow gradient of the fluid is hereby improved. The resistance encountered by the fluid in the different paths through the treatment material is hereby similar, and the material is thus used to maximum extent. Contamination remains behind in the first compartment. Downstream of the first compartment treated or purified fluid is collected in the second compartment and discharged via the outlet formed by the tube, the second opening. The entrance, preferably a second entrance arranged separately of the inlet on the container, is the outlet and can be connected to a conduit in a housing.

The container according to the invention is a substantially cylindrical receptacle. Such a receptacle can be assembled at low cost. The receptacle preferably comprises two cylindrical cup-like parts. The parts can for instance be formed by injection moulding. One of the parts is preferably provided with the entrance or provided with two entrances. The entrance is preferably arranged in a bottom part of the receptacle part. When the inner space is formed by connecting the receptacle parts, the grid bodies are accommodated in the inner space. Only by breaking the connection of the receptacle parts can the grid bodies be replaced. The connection, for instance by gluing or other adhesive connections, is however not easy to break.

Because in one embodiment the vessel is provided with at least one protruding edge which is arranged in the inner space and which is adapted to lie against the grid body, the grid body can support on this protruding edge and the position of the grid body in the inner space can be fixed.

It is further recommended that the tube is placed centrally through the receptacle. The first compartment is then situated around the tube. The fluid for treating flows around the tube, through the first compartment extending from a determined inner radius to a determined outer radius, wherein the outer radius corresponds to the radius of the inner space of the container. Placing the tube centrally prevents the fluid being able to flow through the central part of the first compartment. This central part no longer forms part of the first compartment. The flow gradient for the parts situated a greater distance from the centre is more similar, and so a more balanced and efficient use of the treatment means is hereby obtained.

It is further favourable that the grid body is a circular body. The grid body can then be readily accommodated in a receptacle part lying on a protruding edge.

In a preferred embodiment the grid body is formed by injection moulding. The grid body can be moulded with grid openings which can serve as filter element/membrane. Fluid can flow through the openings, for instance channels.

It is also advantageous for the grid body to comprise a filter cloth, wherein the filter cloth is preferably formed by a material from the group of polypropylene, polyester or stainless steel. Such materials are robust and can be applied for a sustained period in water treatment devices.

The filter cloth comprises a fabric. The cloth is preferably arranged in an injection mould, which is filled with material in order to form the grid body.

The invention is not limited to the invention according to the claim. Said problem can also be solved with a combination of other measures shown in this document or in the drawing. Other combinations, even if an advantage is not explicitly stated, can be the subject-matter, of divisional applications.

DESCRIPTION OF THE DRAWINGS

The invention will be further described with reference to the figures, in which

FIGS. 2A-2E show views of a cross-section of the first embodiment along II-II;

DETAILED DESCRIPTION OF PREFERRED EMBODIMENTS OF THE INVENTION

Figure 1:
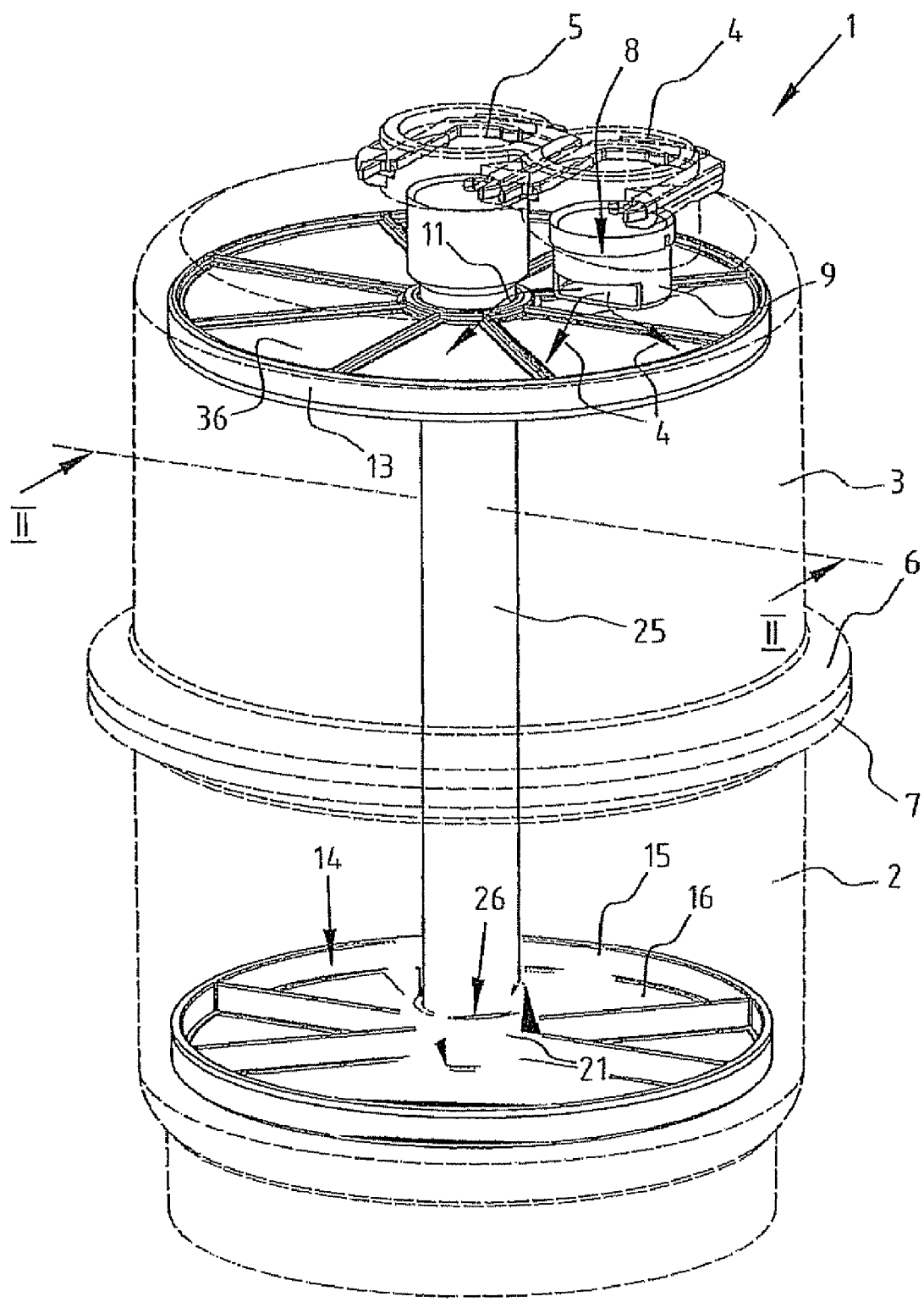
FIG. 1 shows a perspective view of a device according to a first embodiment of the invention.

FIG. 1 shows a treatment device 1. The device can be placed in a household, connected to the mains present in a household. The device can be placed in a cellar, suspended from the wall, for instance via a clamp (not shown).

Treatment device 1 is formed by a receptacle consisting of two parts 2,3. The two parts 2,3 are cup-shaped. The bottoms form the upper and lower ends of the container. Receptacle parts 2,3 are shown with broken lines, whereby parts of the interior of container 2,3 are visible.

Parts 2,3 of the receptacle are connected with the open side to each other. Parts 2,3 each have a collar 6,7. The collars are directed toward each other and mutually connected. The connection can be embodied in different ways. A permanent, non-breakable connection is preferably applied such as a glue connection or a thermal weld.

Parts 2,3 can be formed by injection moulding. A mould for these parts can be formed. Diverse materials can be used. Particularly suitable are known hard plastics. A fibre-reinforced material can optionally be used.

The shape of the receptacle allows container 2,3 to be exposed to high pressure. The receptacle form is particularly suitable for conducting pressure, external pressure as well as internal pressure. The fluids can be guided under high pressure in and out of the container.

The container shown in FIG. 1 has the normal position in which the container is placed in the situation of use. Two entrances 4,5, likewise shown with broken lines, are arranged on an upper end of container 2,3 formed by the bottom of cup part 3.

In the shown embodiment entrance 4 is the first entrance and forms the inlet for contaminated fluid in a preferred embodiment of the invention. Entrance 4 can be connected via coupling means to an outlet pipe in a household. Contaminated fluid from the house is collected in the outlet pipe.

Via entrance 4 fluid can enter the inner space of container 2,3. In another embodiment entrance 5 is used as inlet.

A fluid distributing means 9 is arranged on the inner side of part 3 in line with entrance 4. Fluid entering as according to arrow 8 is distributed in third compartment 10 by distributing means 9. A distribution as indicated with reference numeral 11 can herein take place. Distributing means 9 is an integral part of moulded part 3.

Other distributing means can be applied. The distribution can be further improved. The skilled person will be familiar with distributing means which can distribute a fluid better over a circular compartment such as compartment 10. The great advantage of the shown embodiment is that the distributing means is not a separate component.

The first compartment 12 is situated between two grid bodies 13 and 14. In the preferred embodiment compartment 12 is filled with a treatment means, such as a filter material. An example of a filter material is a resin. This can perform a cationic or an anionic treatment on contaminated water. Specific examples are styrene beads with a functional group. The beads can have a size of 0.3-1 mm diameter. Mixtures of cationic and anionic functional groups can also be applied. A further example is active carbon. A durable product is for instance sand.

In the situation of use of container 2,3 according to the invention the treatment means is contained in compartment 12 between grid bodies 13,14. The resin cannot therefore enter the system during use.

Grid body 13 likewise has a fluid-distributing function. Fluid entering first compartment 10 via entrance/opening 4 will there be able to collect on the surface of grid 36, as indicated below.

The grid bodies comprise a frame part, for instance a body, and a grid part. The body can be formed by injection moulding from a hard plastic. Body 15 of first grid body 14 takes the form of a wheel with spokes. A filter 16 is arranged in the space between the spokes. It is fixedly connected to body 15. The filter can be formed by a grid of stainless steel or a plastic grid, for instance of polypropylene or polyester. The grid size is smaller than the smallest size (diameter) of the resin parts. The resin parts can for instance be screened according to size before being arranged.

Grid body 14 further has a central opening 20. An upright edge 21 is formed on one side of the grid body. A contact surface 22 is formed on the inner side of the round opening and on the inner side of edge 21. Grid body 14 further has on the side remote from edge 21 a number of vanes 23 corresponding to the 'spokes' of the wheel shape 15 of grid body 14.

Grid body 14 is accommodated in the inner space of the receptacle and separates compartment 12 from second compartment 17. Compartment 17 is substantially free of treatment means, as is compartment 10. In the position of use compartment 17 is the lowest part of the container. In the shown embodiment compartment 17 is situated downstream of compartment 12.

Contamination from the fluid remains behind in compartment 12 owing to the treating action of the resin that is present. Purified fluid enters compartment 17 as according to arrow 18 via cloth 16.

In the situation of use tube 25 is received centrally in container 1. Tube 25 connects compartment 17 to opening 59 and entrance 5. These parts together form the outlet of the container in the situation of use. The tube interior 34 forms an open connection from compartment 17 to outlet 5.

The outer end 27 of tube 25 lies in the position of use against contact surface 22 of grid body 14. The tube end is partially received in the chimney-like edge 21. There is hereby no connection to compartment 12.

Adjacently of edge 21 a number of tips 33 are additionally arranged on grid body 14. Tips 33 assist in the alignment of tube end 26 on the contact surface.

Tube 25 is provided with screw thread 28. This is arranged all round the outer side of tube 25. Screw thread 28 co-acts with screw thread 29 arranged on the inner side of opening 30 in grid body 13. Screw thread 29 and screw thread 28 form a mutually engaging system.

Figure 3:
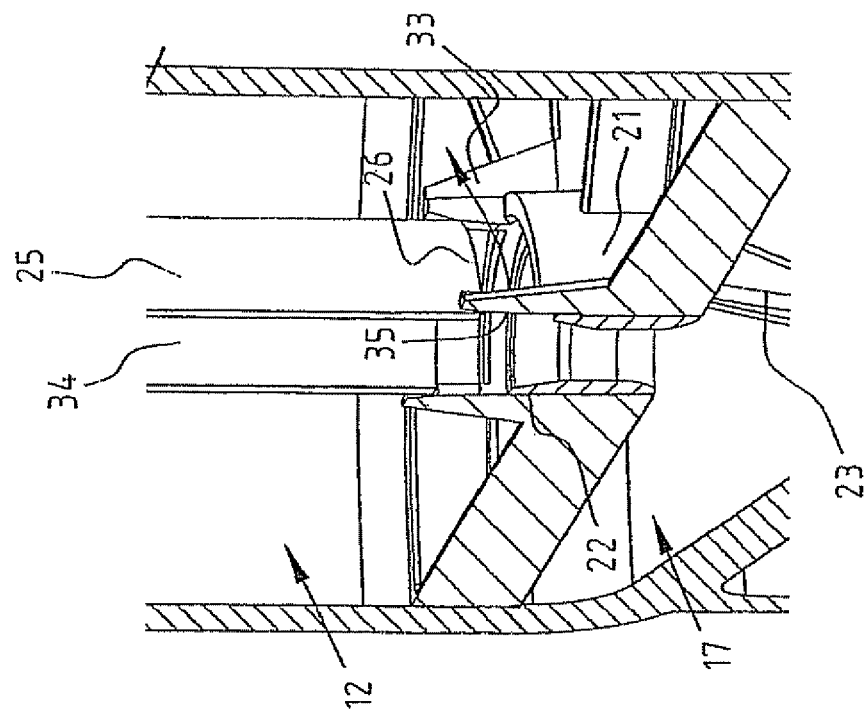
FIG. 3 shows a detail according to III of the first embodiment.

Through rotation as according to arrow 31, as shown in FIG. 2B, the mutually engaging system will bring about a displacement or movement of tube 25 relative to the container. Tube 25 will move as according to arrow 32. When unscrewed from the normal position of use, the tube will move upward as according to arrow 32. Tube end 26 will herein be released from contact surface 22. Created between tube end 26 and contact surface 22 is an opening which connects the tube interior 34 to compartment 12. The containment of the treatment means is hereby ended. In the situation according to FIG. 2B and FIG. 3 the packing means can be admitted into compartment 12 or removed therefrom via entrance 5 and using tube 25. The flow of the resin via tube interior 34 is indicated with arrow 35.

According to an embodiment, the tube is accommodated in the inner space for movement according to arrow 32. Other, different guides or locking means can be used instead of the mutually engaging system of screw threads 28 and 29.

The tube outer end 37 can be formed as polygonal recess. Tube outer end 37 can hereby be engaged through opening 5 with a corresponding tool such as a socket wrench. Via the opening the tube can be rotated out of its position as shown in FIG. 2A.

Other engaging means are possible for engaging the tube 25 received in the inner space.

Other connecting means are possible. Tube 25 can be provided with a controllable valve which can connect inner space 34 to first compartment 12. The valve can be opened and closed.

Particularly advantageous in the preferred embodiment according to FIGS. 1 and 2 is that the resin can also be discharged from compartment 12 via an underside of this compartment. The force of gravity which acts on the resin can herein be used as additional means. The force of gravity ensures that the resin collects on the bottom, i.e. the top side of grid 16, of first compartment 12.

FIG. 2C shows filling of compartment 12 with a resin. The resin is taken up in a carrier, in this case a fluid such as water. In another embodiment air is used or nitrogen as propellant gas.

FIG. 2C shows the feed of resin via entrance 5 into the tube interior. The resin is carried with fluid into compartment 12 according to arrow 35.

In the shown embodiment the connection of tube 25 to compartment 17 which is open in the situation of use is closed by arranging a plug means 40 in tube 25. Plug means 40 is a rod 41 which has on an outer end a rubber flange 42 protruding all round. In the shown situation flange 42 lies against contact edge 22 of grid body 14. The connection between tube interior 34 and compartment 12 is not hereby closed. Fluid and/or resin can still be carried via tube 25 into compartment 12 as according to arrow 44. Nor are the spaces between the ribs of upright edge 21 closed.

Arranging the plug means 40 in tube 25 prevents resin being guided into second compartment 17. Excess carrier, water or a gas can be guided outside the inner space of the receptacle via entrance 4 as according to arrow 43.

FIG. 2D shows a possible situation of a treatment device for further flushing according to the invention after filling. Tube 25 is rotated back or screwed shut, wherein outer end 26 lies against contact surface 22 of grid body 12. After filling, tube 25 can thus be moved centrally through receptacle 2,3 in vertical direction, i.e. in lengthwise direction of the receptacle, as according to arrow 32. Tube 25 is placed in the closed position.

Plug means 40 and flange 42 are displaced slightly axially upward as according to arrow 32, thereby creating a gap between flange 42 and edge 22 between which flushing can take place. The inner diameter of the round tube 25 is a little larger than the outer diameter of flange 42. Plug means 40 with flange 42 is movable freely as according to arrow 32 in the tube interior.

When treatment device 1 has just been filled as according to FIG. 2C, for the sake of certainty the further flushing according to FIG. 2D can then be performed. Rod 41 of plug means 40 can be hollow. Fluid can be transported as according to arrow 45 to compartment 17 via the hollow rod 41. Fluid can also be guided as according to arrow 46 into the third compartment via entrance 4. It will herein be guided through resin 47 as according to arrow 48. The fluid will be guided through the cloth 16 of grid body 14 into compartment 17. It there comes together with the fluid coming out of rod 41. Both fluids are guided back outside as according to arrow 49 via tube interior 34 of tube 25. The rubber flange 42 can herein leave space free between flange 42 and contact surface 22.

Rotation of tube 25 back to the position of use can also result in an advantage according to another aspect of the present application. A problem in the current treatment device is certain placing of grid bodies in an inner space. According to the invention at least two grid bodies 13, 14 are provided. The grid bodies are enclosed in the inner space, for instance by connecting the two receptacle parts 2,3. Protrusions or contact surfaces 50,51 are herein formed in the inner space of the receptacle during injection moulding of receptacle parts 2,3. The grid bodies have a form, in particular a circular form, corresponding with the protrusion or the contact surface. The grid bodies are placed lying on protrusions 50, 51. By arranging a spacer means such as tube 25 a pressure force is exerted on the respective grid bodies 13,14 which will want to press the grid bodies apart in a longitudinal direction of the receptacle and which press the grid bodies onto protrusions 50,51, whereby the grid bodies are held in their position. According to the preferred embodiment the pressure force is exerted by rotating tube 25 as according to arrow 31 to the situation shown in FIG. 2D, wherein the tube end lies against contact surface 22 of grid body 14, while on the other side close to the other tube end of tube 25 a mutually engaging system of screw threads is formed with the other grid body 12. By rotating tube 25 further by means of engaging means 37, a large moment of force can be generated in simple manner, whereby the required pressure is exerted on the grid bodies.

After filling and optional flushing the treatment device can be used normally. Entrance 4 is connected to for instance a waste water pipe, while entrance 5 is connected to a feedback pipe. Plug means 40 is removed from tube 25 before entrance 5 is connected.

Fluid is then cleaned by feeding it according to arrows 46 and 48 and discharging it according to arrow 49.

Figure 2E:
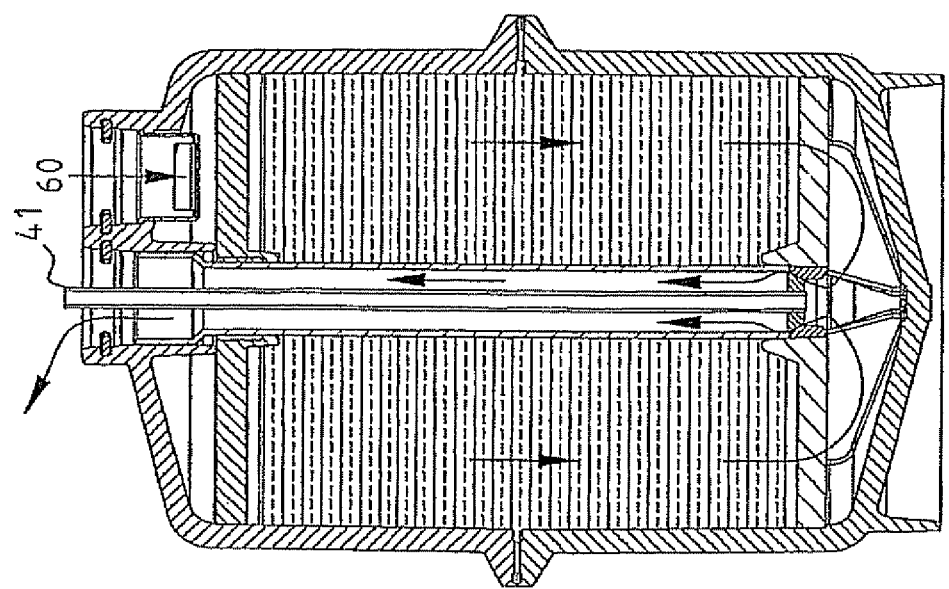

FIG. 2E is a further illustration of an application of treatment device 1 according to the invention. Via entrance 4 and/or via hollow rod 41 compressed air 60 can be introduced into the inner space. Using compressed air the fluid that is present, in particular the fluid such as water, can be guided out of the diverse compartments. This is particularly favourable when the resin-filled treatment device must be transported. A weight-saving results from discharging the water therefrom. The discharge of the water takes place in a manner similar as in the position of use.

A further application of the use of compressed air is that the treatment device from which the water is removed will be protected against frost.

Treatment device 1 is suitable for 2000-4000 liters/hour. Other flow rates are however also possible. In an apartment complex a number of treatment devices according to the invention can be placed in parallel for processing the waste water.

Treatment device 1 is reusable. Contaminated resin can be guided out of the first compartment 12 by taking the connecting means of the tube out of the position of use and placing them in the filling position according to FIG. 2B. Making use of a copious flushing with fluid the resin can herein be guided out of first compartment 12 and discharged via tube 25 and outlet 5. A fresh resin can be arranged in the then empty compartment 12.

Although treatment device 1 is shown on the basis of a preferred embodiment, the invention is not limited thereto. Diverse modifications are possible within the essence of the invention as stated in the appended claims.

The invention claimed is:

1. Device for treating a fluid, comprising a container with opposite ends and an inner space, at least one access to the inner space arranged on one of the opposed ends of the container, wherein the at least one access comprises a first opening and a second opening, a first grid body which is arranged in the inner space adjacent the other one of the opposed ends, a third opening extending through the first grid body that is axially aligned with the second opening, and a tube having a first free end that remains sealingly engaged with the second opening and a second free end that can axially engage with and disengage from the third opening, wherein the first grid body divides the inner space into a first compartment for a treatment medium connected to the first opening and a second compartment which is connectable by the tube to the second opening and which is free of treatment medium, wherein the tube has a connecting arrangement connecting the second opening to the first compartment, wherein the connecting arrangement comprises a device adjacent the second opening that co-acts with a screw thread on the tube to axially move the tube between a first position in which the second free end engages the third opening to connect the second opening to the second compartment as the tube is rotated in a first direction and a second position in which the second free end is disengaged from and spaced apart from said third opening to connect the second opening to the first compartment as the tube is rotated in a second direction opposite to the first direction, and wherein the treatment medium can be carried in or out of the first compartment through the second opening and the tube by way of the connecting arrangement when the second free end of the tube is axially disengaged and spaced apart from the third opening.

2. Device as claimed in claim 1, wherein the tube has an engaging device which is engageable through the second opening for rotating the tube between the first and second positions.

3. Device as claimed in claim 1, wherein the third opening has a contact surface on which an outer end of the tube lies.

4. Device as claimed in claim 3, wherein the contact surface is formed by an inner edge of an upright edge of the third opening.

5. Device as claimed in claim 1, wherein said device is a second grid body disposed in the inner space between the first opening and the first compartment.

6. Device as claimed in claim 5, wherein the second grid body has an opening having a screw thread which co-acts with the the screw thread on the tube.

7. Device as claimed in claim 1, wherein said first opening is an inlet for fluid.

8. Device as claimed in claim 7, wherein a fluid distributing arrangement is provided between the first opening and the first compartment.

9. Device as claimed in claim 1, wherein the container is a substantially cylindrical receptacle.

10. Device as claimed in claim 9, wherein the receptacle comprises two cylindrical cup-shaped parts.

11. Device as claimed in claim 9, wherein the receptacle is provided with at least one protruding edge which is arranged in the inner space and which is adapted to lie against the second grid body.

12. Device as claimed in claim 9, wherein the tube extends centrally through the container.

13. Device as claimed in claim 1, wherein the second grid body is a circular body.

14. Device as claimed in claim 1, wherein the second grid body comprises a filter cloth.

15. Device as claimed in claim 14, wherein the filter cloth comprises a material selected from the group of polypropylene, polyester and stainless steel.

16. Device as claimed in claim 1, wherein the treatment medium comprises a resin filter material.

\* \* \* \* \*